April 22, 1952  LA VERNE R. PHILPOTT  2,593,484
AUTOMATIC AIRCRAFT PROPELLER SYNCHRONIZER
Filed Nov. 19, 1945  5 Sheets-Sheet 1

Inventor
LAVERNE. R. PHILPOTT

By M. O. Hayes

Attorney

April 22, 1952  LA VERNE R. PHILPOTT  2,593,484
AUTOMATIC AIRCRAFT PROPELLER SYNCHRONIZER
Filed Nov. 19, 1945  5 Sheets-Sheet 2

Inventor
LAVERNE R. PHILPOTT
By M. C. Hayes
Attorney

April 22, 1952  LA VERNE R. PHILPOTT  2,593,484
AUTOMATIC AIRCRAFT PROPELLER SYNCHRONIZER
Filed Nov. 19, 1945  5 Sheets-Sheet 3

Inventor
LAVERNE R. PHILPOTT

April 22, 1952  LA VERNE R. PHILPOTT  2,593,484
AUTOMATIC AIRCRAFT PROPELLER SYNCHRONIZER
Filed Nov. 19, 1945  5 Sheets-Sheet 5

Inventor
LAVERNE R. PHILPOTT
By M. O. Hayes
Attorney

Patented Apr. 22, 1952

2,593,484

UNITED STATES PATENT OFFICE 2,593,484

AUTOMATIC AIRCRAFT PROPELLER SYNCHRONIZER

La Verne R. Philpott, Washington, D. C.

Application November 19, 1945, Serial No. 629,689

4 Claims. (Cl. 170—160.17)

(Granted under the act of March 3, 1883, as amended April 30, 1928; 370 O. G. 757)

The present invention relates in general to synchronizing apparatus for multiple engine power plants such as are used in multi-engine airplanes, and in particular to that type in which the speed of the engines is varied by variation of the pitch of the propellers driven by the engines.

In operation of multi-engine aircraft, one of the problems is to maintain under normal cruising conditions, the rotational speed of all of the power plants at the same level, to avoid objectionable beat effects set up by lack of synchronization and likewise to provide for substantially equal power output from all of the power plants. Aircraft engines are now equipped in most instances with controllable pitch propellers, and due to the variable loading effects of propeller pitch on the engine as the pitch is varied, recent developments have provided for automatic control of the propeller pitch as a means of varying the engine speed.

One type of controllable pitch propeller is that shown in the Blanchard Patent No. 1,951,320, wherein an electric motor carried by the propeller may be energized to either increase or decrease the pitch of the propeller blades.

An important object of the invention is the provision of an apparatus effecting a substantial reduction in weight and bulk of such systems without sacrifice of dependability in operation.

Another object of the invention is the provision of a synchronizing system in which the various control circuits and apparatus elements except those requiring direct mechanical connection with the engines to be synchronized are constructed and arranged to be mounted as a unit directly on the pilot's instrument panel of an airplane.

Another object of the invention is the provision of a synchronizing system in which the various control circuits and electrical contacts are constructed and arranged to be mounted in a single enclosed unit adapted to be pressurized so as to remove any effects high altitude may have on the electrical characteristics of the system.

Other objects, advantages and capabilities of the invention will become apparent from the following description, taken in conjunction with the accompanying drawings, showing only a preferred embodiment of the invention, in which:

Figure 6 is a diagram of a synchronizing system embodying the apparatus shown in Figs. 1 to 5 and the electrical circuits associated therewith.

Figure 1:
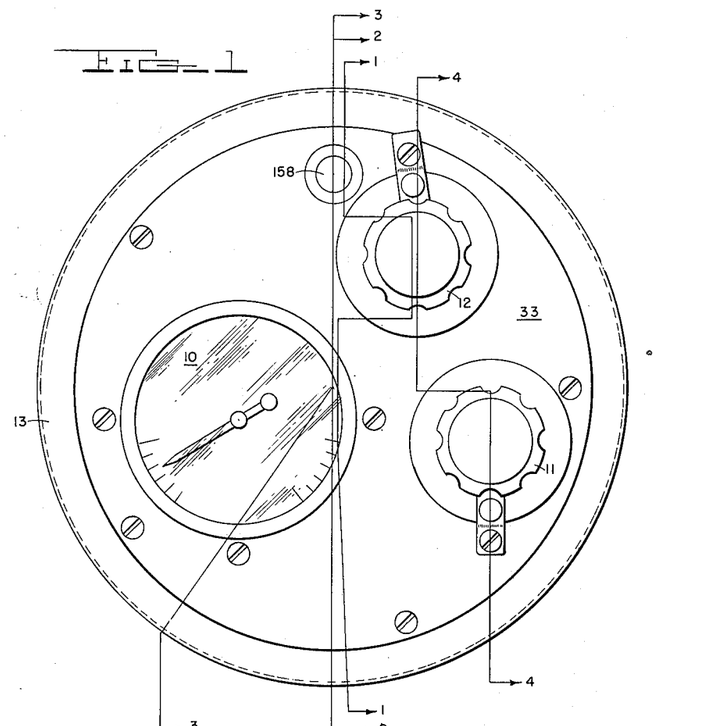
Figure 1 is a front elevation of the master control unit.

Referring first to Fig. 1, this illustrates the front view of the control unit as it appears on the pilot's instrument panel and consists of a conventional drag-cup tachometer indicator 10 geared directly to a master motor 15 (Fig. 2) to indicate the rotational speed in thousands of revolutions per minute of the master motor, a master motor control knob 11 coupled to a governor control mechanism for the master motor 15, to be later described, and a timing motor control knob 12 coupled to a governor control mechanism for the timing motor 16 (Fig. 2), to be later described. These controls and the tachometer indicator constitute all the external controls necessary for effective operation of the synchronizing system. The knobs 11 and 12 are provided with disks integral therewith adapted to be selectively held by any conventional clamping members, such as those shown in Fig. 2, to hold the control knobs in their position of adjustment against shifting due to vibrations in the aircraft.

Figure 2:
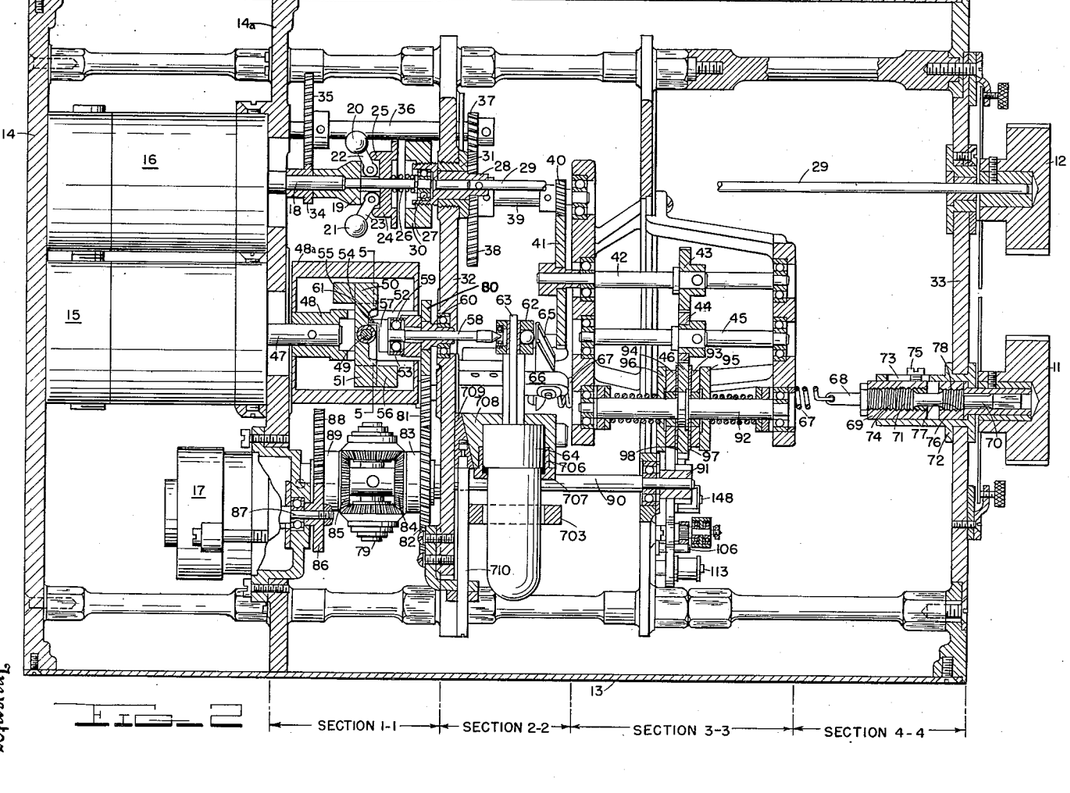
Figure 2 is a composite vertical, longitudinal staggered section taken on the lines 1—1, 2—2, 3—3, 4—4 of Figure 1.

Referring now to Fig. 2, there is shown a housing 13 completely enclosing with rear and front plates 14 and 33 the various control circuits and apparatus elements of the system, and adapted to be pressurized to prevent any variation of the pressure surrounding the electrical contacts and control devices, to be later described, due to variation in the altitude at which the system is operated. The electrical outlets and bearings for control knobs, etc. would accordingly be provided with seals or packing to prevent leakage therefrom. In addition, a conventional motor-driven pump may be coupled to the shaft of the master motor and controlled by a valve mechanism in the pressurized housing for pumping air into the housing and maintaining the pressure at a preset level. This is to reduce the tendencies of the contacts to burn seriously when the pressure surrounding the contacts is low and thus to increase the life of the contacts which, in the absence of such an arrangement, can completely burn out in less than one flight. Mounted on the mounting plate 14a supported within this housing are a master motor 15, a timing motor 16 and a plurality of three phase synchronous motors, such as motor 17, each of the synchronous motors being electrically coupled to the field output of a three phase generator, such as the generator 153 shown in Figure 6, the rotor of which is mechanically coupled to the output shaft of one of the engines.

Figure 3:
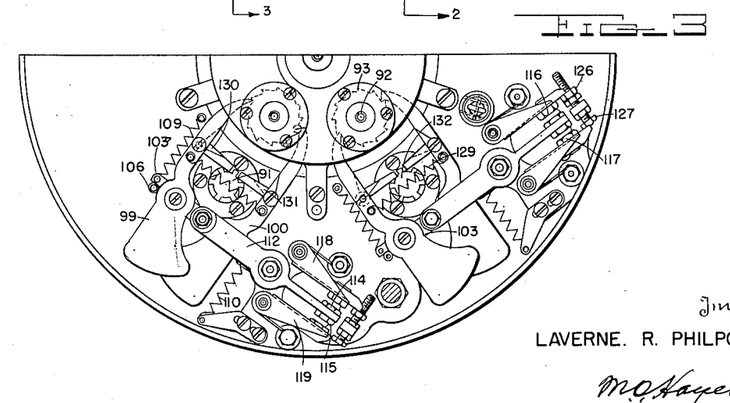
Figure 3 is a front elevation of a sector of the intermediate mounting plate carrying the escapement mechanisms for controlling the pitch of the propellers.

In Figure 2 and the following description, only one of these synchronous motors and its associated circuits are shown or described, since the synchronizing circuits for each of the motors operate in conjunction with the master motor 15 in the same manner. Figure 3, however, shows the escapement mechanisms for each of the engines of a two-engine airplane mounted in proper relation with the timing shaft.

Synchronizing of the engines is accomplished, generally, by setting the speed of the master motor 15 to a desired value, and comparing the output of the master motor 15 with that of each of the three phase synchronous motors individually, each of which duplicates the output of the engine to which it is coupled. The difference between the output of these two motors actuates a control device to energize the propeller pitch-control motor, such as motor 141 in Figure 6, to bring the engine back into synchronism with the master motor. To control the duration of time during which the propeller pitch-control motor is energized, the timing motor 16 and the control and coupling mechanisms by which it is coupled to the control-device for the pitch-control motor are provided. This timing apparatus consists of the following elements. Coupled to the output shaft 18 of the above mentioned timing motor 16 is a governor mechanism comprising a spacer sleeve 19 keyed to the shaft 18 and carrying centrifugal governor weights 20 and 21 by means of pivotally mounted arms 22 and 23. A sliding drum 24 is slidably mounted on shaft 18 and carries a ring-like shoulder 25 positioned to engage the arms 22, 23 of the governor. Engaging the opposite surface of the drum 24 is a resilient spring member 26 surrounding the shaft 18 and abutted at its other end by a bearing member 27. Surrounding the bearing member 27 is a threaded sleeve 28 keyed to a control shaft 29 and supporting by a threaded connection a friction drum 30. The threaded sleeve 28 is supported by a bearing 31 mounted in intermediate mounting bracket 32. The control shaft 29 extends through the front plate 33 of the housing 13 and is keyed to the timing motor control knob 12. It should be apparent that rotation of the control knob 12 will rotate the threaded sleeve 28 within its bearing 31, thereby shifting the friction drum 30, threaded to the sleeve 28, toward or away from the sliding drum 24. As the speed of rotation of the timing motor shaft 18 is increased from zero, the centrifugal force on the governor weights 20, 21 increases, extending the governor arms 22, 23 to a position more nearly perpendicular to the shaft 18. This increasing speed, by increasing the angle between the governor arms and the shaft, shifts the sliding drum 24 bearing against the arms 22, 23 toward the stationary friction drum 30 until the speed is such that the sliding drum 24 is prevented from sliding by engagement with the friction drum 30, thus determining the maximum speed of the motor since the governor mechanism applies a braking action at this speed to load the motor down.

The timing motor 16 drives a timing gear 46 in an escapement mechanism 148 controlling the propeller pitch control motor through a helical gear train comprising gear 34 mounted on shaft 18, gear 35 meshing therewith, shaft 36, gears 37 and 38, shaft 39, gears 40 and 41, shaft 42, gear 43 on shaft 42, gear 44 mounted on shaft 45 and timing gear 46 meshing with gear 44.

Figure 5:
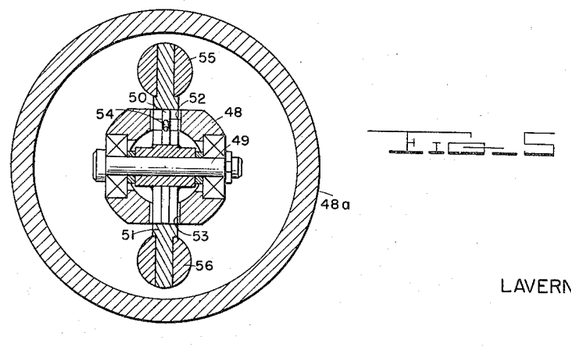
Figure 5 is a cross-section of the master motor governor taken on the lines 5—5 of Figure 2.
Figure 7:
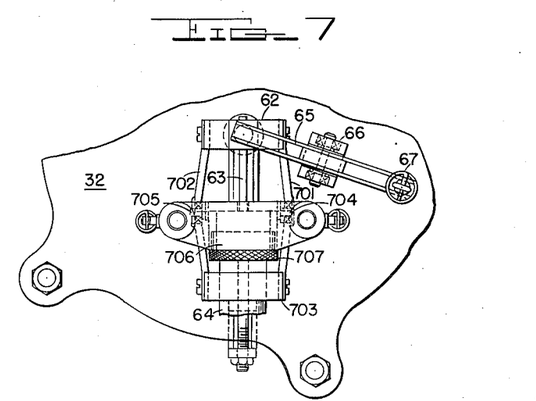
Figure 7 is a detail elevation of the support member for the vacuum switch arm.

The above mentioned mechanism for controlling the speed of the master motor and comparing it with the speed of each of the engines is as follows. Referring still to Fig. 2, keyed to the shaft 47 of master motor 15 is a governor housing sleeve 48, shown in cross section in Fig. 5, having a hollow cylindrical portion through which extends a transverse shaft 49 mounted at opposite sides of the housing to form a pivot for the governor arms 50, 51. The governor arms 50, 51 extend through slots 52, 53 in the governor housing sleeve 48. A slot 54 is cut into the governor arm 50 at a point away from that at which the arms 50, 51 are pivoted to hub 49 and extending parallel to the longitudinal axis of the arm 50. Mounted on the outer or free end of the arms 50, 51 are weights 55, 56 one extending forward of the arm on which it is mounted and the other extending aft of its arm, so that as the speed of rotation of the governor housing sleeve 48 is increased, the centrifugal force on these weights 55, 56 due to the rotation of the arms 50, 51 orientates the arms away from the perpendicular to the shaft 47. Supported within the housing sleeve 48 and abutting against the governor arms 50, 51 is a push-rod head 57 having a shaft extension 58 of reduced diameter supported within bearing rollers 59 and the ball thrust bearing in the block 62 and free to slide longitudinally within bearing 59. Gear hub 60 is bored out to clear the shaft extension 58. Mounted at a point on the circumference of the push-rod head 57 and extending parallel to the axis of shaft 47 into the slot 54 of governor arm 50 is a pin 61. The complete governor mechanism is housed in a surrounding thick-walled cylinder 48a enclosing the arms 50, 51 and supported at both ends by a supporting disk, one bearing on each end of the housing sleeve 48. This provides the motor with a sufficiently large moment of inertia or fly wheel effect to maintain stable or only very slightly erratic speed regulating irregularities about the desired operating speed. If the housing cylinder and thus the moment of inertia is too small, large amplitude speed hunting will result. Abutting the free end of the shaft extension 58 is a block member 62 carrying the pivoted arm 63 of a conventional vacuum switch 64 which controls the speed of master motor 15 by means of a pair of normally closed contacts connected across a resistor in series with the windings of motor 15. The pivoted arm 63 is surrounded by a damping material such as rubber in the block 62 to prevent contact chatter in the switch 64. The block member 62, shown in detail in Figure 7, has downwardly extending members 701, 702 connected thereto, extending parallel to the pivoted arm 63 past the main body of switch 64. The members 701, 702 are provided with a counterweight 103 on their lower extremities surrounding the glass envelope of the vacuum switch 64 and are pivoted on pins 104, 105 to the intermediate mounting plate 32 near the point of entry of the arm 63 into the body of switch 64 to properly regulate the movement of block 62. A threaded member 106 having a knurled knob 107 extending therefrom is likewise provided to lock the position of switch 64 in seating bracket 108 mounted to move in a direction perpendicular to plate 32. A wedge shaped member 109 is adjustably positioned to engage an inclined face of the seating bracket 108 and controlled by an adjusting rod 110 threaded into the wedge member 109 for varying the position of the seating bracket 108 and thus the switch 64 with respect to the intermediate mounting plate 32. Resiliently urged against the opposite side of the block member 62 is a lever 65 pivoted on a yoke 66. The other end of the lever 65 is connected by means of a spiral spring 67 to a stud 68 on slide member 69 surrounding the shaft 70 keyed to a master motor control knob 11, the shaft having threaded portions 71 and 78. The end of spring 67 adjacent the lever 65 is secured to the lever 65 by means of a turnbuckle stud by which the tension of the spring and thus the maximum speed permitted by the governor mechanism may be adjusted during assembly. The shaft 70 is supported within a fixed bearing housing 72 having a longitudinal slot 73. The housing 72 also supports the slide member 69 threaded on its inner surface at 74, the threads 74 being positioned to engage threaded portion 71 of shaft 70. The slide member 69 also carries a stud member 75 extending into the longitudinal slot 73 in the housing 72 to allow the slide 69 to move parallel only to the axis of shaft 70. A fixed bearing nut 76 is mounted within housing 72 and is threaded at 77 to engage the threads 78 on shaft 70. Threads 77 and 78 are pitched in the opposite direction as threads 71 and 74 so that a given degree of rotation of knob 11 will move the sleeve 69 through twice the longitudinal distance that a single pitch threaded drive would move the sleeve.

Thus, rotation of knob 11 rotates and axially shifts the shaft 70, driving the slide member 69 through threads 71 and 74 toward or away from the lever 65 and increasing or decreasing the tension on the connecting spring 67, since the slide 69 is prevented from rotating by stud 75 and slot 73.

Assuming the direction of movement of the slide 69 is away from lever 65, the force in the direction of the block member 62 and thus on switch plunger 63 will be increased. Thus, a greater speed will be required of the master motor 15 to so orientate the governor arms 50 and 51 away from the perpendicular to the axis of shaft 47 that the push-rod head 57 and extension 58 are cammed against the bar member 62 with sufficient force to overcome that of the lever 65 and move the block member 62 and plunger 63 to open the contacts in vacuum switch 64. The motor speeding up to the predetermined speed to which the governor is set maintains a repeated opening and closing of the switch 64 in response to slight increase and decrease in speed with respect to the chosen standard. Each opening of the switch upon increased speed opens the shunt circuit to include a resistor in series in the motor circuit which effects a reduction in motor speed to just below the standard with consequent reclosing of the switch and reacceleration of the motor. Thus the motor is maintained at substantially constant speed, the variation in speed being so small in degree and their duration so brief as to be negligible. The slot 54 and pin 61 are employed to increase the sensitivity of the governor control, since the component of movement of the governor arms at any given point away from their pivotal point in the direction of the axis of shaft 47 as the governor arms are orientated in that plane is greater at the center of the arm than at one of its edges, i. e. the slippage which a rider cam would experience in a direction perpendicular to the axis of shaft 47 would be far greater if the cam were engaging an edge of the governor arm.

The means for coupling the output of master motor 15 to a subtracting differential gear system 79 by which it is compared with the output of one of the three phase synchronous motors 17, and thus of one of the engines, is a speed reduction gear train comprising helical gear 80 mounted on the governor housing 48a to rotate therewith and driving through gear 81 a helical gear 82 on hub 83 of gear 84. Gear 84 of the differential 79 thus provides the input from the master motor 15. The output from the three phase motor 17 is coupled to the gear 85 of the differential 79 by means of gear 86 keyed to the output shaft 87 of motor 17 and gear 88 meshing with gear 86 and mounted on the hub 89 common to both gears 88 and 85. The subtracting output of these two input speeds is coupled from the differential 79 by shaft 90 directly to trip rotor 91 in the escapement mechanism 148 controlling the propeller pitch-control motor. Thus any difference in the speeds of the engine and the master motor will result in rotation of the trip rotor 91 in a direction determined by the greater of the two speeds.

Figure 4:
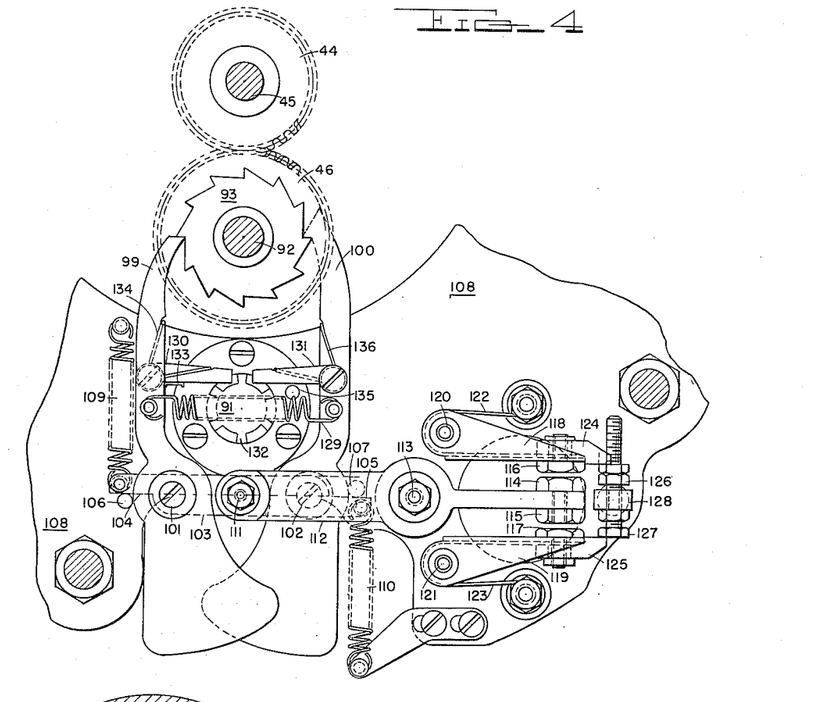
Figure 4 is an enlarged elevation of one of the escapement mechanisms.

Referring now to Figures 2, 3, and 4 the escapement mechanism 148 controlling the propeller pitch-control motor, one of which is provided for each engine, is as follows. Mounted coaxially with the above mentioned timing gear 46 on a shaft 92 are a pair of ratchet wheels 93 and 94, one on each side of gear 46. These ratchet wheels 93 and 94 are free to rotate with respect to shaft 92 and are adapted to be driven independently and frictionally by gear 46 through friction clutch disks 95 and 96 axially slidable on the shaft 92 and holding the ratchet wheels 93 and 94 between the clutch disks 95 and 96 and clutch disks 97 and 98 loosely mounted on shaft 92. The clutch disks 95 and 96 are urged resiliently against the adjacent faces of the ratchet wheels 93 and 94 by springs surrounding the shaft 92 and held between a face of the clutch disks and an adjustable shoulder member on shaft 92, the pressure of the clutch springs being adjustable by positioning the shoulder member by means of lock nuts on the ends of shaft 92. Engaging a shoulder of ratchet wheels 93 and 94 in normal position are pawl members 99 and 100, pawl 99 abutting a shoulder on ratchet wheel 93 and pawl 100 abutting a shoulder on ratchet wheel 94. Pivoted to the lower portion of pawls 99 and 100 at points 101, 102 is a connecting lever 103 having shoulder extension portions 104 and 105, one at each end of the lever 103, adapted to engage stop pins 106 and 107, respectively, on intermediate mounting plate 108, the pins 106 and 107 defining the limit of counterclockwise rotation about its center of which the lever 103 is capable. Also connected to the ends of lever 103 are spring members 109 and 110, each secured at their other end to the mounting plate 108 so as to urge the lever 103 to rotate away from the stop pins 106, 107. Pivotally connected by a pin 111 to the center of the connecting lever 103 is a main arm 112 pivoted on its center by a pin 113 on the mounting plate 108 and carrying on the end opposite that connected to lever 103 two electrical contact members 114 and 115. The main arm 112 is at electrical ground by virtue of its flexible electrical connection (not shown) to plate 108. Positioned to be engaged by contact members 114 and 115 respectively, when the main arm 112 is rotated about pin 113, are contacts 116 and 117, mounted on contact arms 118 and 119, respectively, the contact arms 118 and 119 being pivotally mounted on plate 108 by pins 120, 121 and resiliently urged toward the contact members 114 and 115 on main arm 112 by spring members 122 and 123.

The contacts 114, 115, 116 and 117 are in the field winding circuit of an electric propeller pitch motor having increase and decrease field coils, one for operating the motor in a direction to increase the propeller pitch and the other in a direction to decrease pitch, the contacts 114, 116 energizing the motor to rotate in such a direction as to increase the pitch of the propeller when the contacts are closed, while contacts 115, 117 energize the motor to rotate in the direction to decrease the pitch of the propeller. This is accomplished by virtue of the fact that the contacts 116 and 117 close the circuit to opposite field coils in the motor, comprising an increase coil arranged to run the motor in a direction opposite to that caused by the decrease coil. To determine the position contacts 116 and 117 occupy in normal condition with respect to contacts 114, 115, insulating blocks 124 and 125 are mounted on the free ends of contact arms 118 and 119, respectively, and extend outwardly therefrom to engage stop members 126 and 127 adjustably positioned on adjusting member 128 on mounting plate 108. Also connected between the above mentioned pawl members 99, 100 is a spring 129 resiliently urging the teeth of the pawl members 99, 100 toward each other and thus toward the ratchet wheels 93, 94.

Pivoted to the upper portion of the pawl members 99, 100 are triggers 130 and 131, and positioned so that the end of one of the triggers 130 and 131 will be engaged by one of the lugs 132 on trip rotor 91 when the trip rotor is rotated. Urging the trigger 130 downwardly against a stop 133 on the pawl 99 is a spring 134, the stop 133 carrying the end of trigger 130 upward out of position to engage the lugs 132 when the pawl 99 is moved upward. A spring 136 is arranged to urge the trigger 131 downward against a stop 135 on the mounting plate 108, the stop 135 camming the trigger 131 upward out of position to engage the lugs 132 when the pawl 100 is moved downward.

Operation of this escapement mechanism is as follows. Assuming a condition of normal operation in which the speed of the master motor 15 and the three phase synchronous motor 17, and thus the engine, are the same, the output of the subtracting differential is zero and the trip rotor 91 remains stationary. The timing gear 46, however, is continuously rotated, due to the constant speed drive of motor 16 and its gear train. The condition of the escapement mechanism is as shown in Fig. 4 in which a shoulder of the ratchet wheels 93 and 94 is in engagement with one end of pawl 99 and pawl 100, respectively, urging the pawl 99 downward and pawl 100 upward to a position whereby the shoulders 104 and 105 of the lever 103 connected between the pawls 99, 100 engage stops 106 and 107. Thus, the gear 46 and its associated friction disks 95, 96, 97 and 98 may be rotated continuously but no motion is transmitted to the ratchet wheels 93, 94 since they are held against rotation by the pawls. This condition centers arm 112 and maintains contacts 114, 116 and 115, 117 in an open condition.

However, if the speed of the engine decreases to a value below that of the master motor 15, the differential 79 yields an output proportional to this difference in speed and in the same direction as gear 84 which is driven by the master motor. This differential output drives the trip rotor 91 in the escapement mechanism in, for example, a counterclockwise direction, bringing one of the lugs 132 in to engagement with trigger 130 and forcing the trigger 130 and the pawl 99 connected thereto away from the trip rotor 91 and moving the end of pawl 99 out of engagement with the shoulders on ratchet wheel 93. The pawl 100 is not disturbed, since rotation of the trip rotor 91 in a counterclockwise direction merely cams the trigger 131 upward against its spring 136, thus allowing the pawl 100 to be held against downward movement. With the pawl 99 out of engagement with the ratchet wheel 93, the spring 109 carries pawl 99 up and over the shoulder of ratchet wheel 93, thus carrying the ends of connecting lever 103 connected thereto upward and rotating the lever 103 about the stop 107. This rotation of lever 103 lifts the end of the main arm 112 pivoted at 111 to the center of lever 103, thereby rotating the main arm 112 clockwise about its center pivot 113 to engage the grounded contact 115 on the main arm 112 with the lower contact 117, closing the circuit to the decrease field coil of the propeller pitch-control motor to decrease the pitch of the propeller and thereby decrease the loading on the engine. The disengagement of the end of pawl 99 with ratchet wheel 93 allows the ratchet wheel to be rotated with the timing gear 46 through friction disks 95 and 97. Pawl 99 simultaneously flies upward till it disengages trigger 130 from lug 132 at which time spring 129 returns the face of pawl 99 against the face of ratchet 93. It continues upward till it strikes the next shoulder of ratchet wheel 93. At about half way up in its stroke (pawl 99) contacts 115 and 117 are closed. The remainder of the stroke of 99 causes a rotation of contact arm 119 against the spring 123. As ratchet wheel 93 continues to turn, pawl 99 is gradually returned to its downward position, opening contacts 115 and 117 on its way and finally seating in its former position as determined by the stop 106, thus completing one correction cycle. The contact arms 118 and 119 are pivotally mounted to enable the contact arm to be carried downward or upward with the contact 114 or 115 when in engagement therewith when the main arm 112 is rotated, thereby allowing the contacts to be closed for a fixed maximum period of time during each correction cycle. The duration of this period is determined by the setting of the adjustable stops 126 and 127, and the speed of the timing motor driving ratchet 93. It will be apparent that the setting of these stops 126, 127 and the speed of the timing motor 16 thus determine the time the propeller pitch-control motor is energized, and thus the change in propeller pitch, during each correction cycle.

If the engine and thus the motor 17 were rotating at a speed greater than that of the master motor 15, the differential output would rotate in the opposite direction, rotating the trip rotor 91 clockwise and tripping pawl 100 to close the upper set of contacts 114, 116 and energize the pitch-control motor to increase pitch in a manner similar to that above described.

Figure 8:
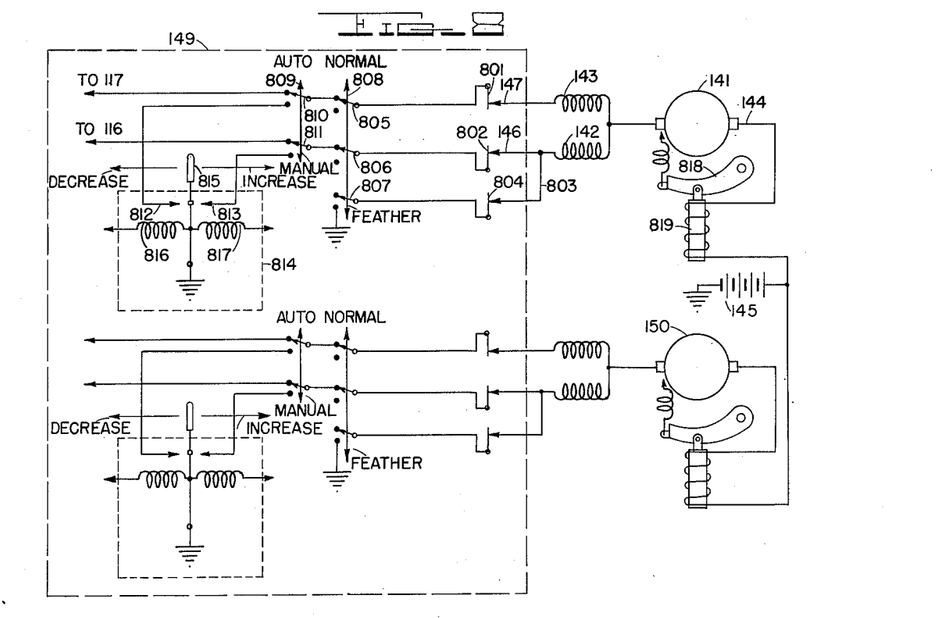
Figure 8 is a schematic diagram of the pitch control motor control switchboard.

Referring now to Figures 6 and 8, there is shown diagrammatically the master control unit of Figures 1 to 5 with ancillary circuits and apparatus connected for synchronizing two airplane engines 137 and 138 provided with adjustable pitch propellers 139 and 140 through which adjustment of the engine speed, over a range ample for synchronization, is effected by adjustment of the propeller pitch. Such adjustment is accomplished through a conventional reversible pitch control motor, such as motor 141 associated with the engine 137, having increase and decrease field coils 142 and 143, one for operating the motor in a direction to increase the propeller pitch and the other in a direction to decrease the pitch. One end of each of the coils is connected through conductor 144 to the positive end of the ship's battery 145, the negative end of the battery being connected to a common or ground connection including the metal frame of the machine. The other end of the increase and decrease coils are connected through conductors 146 and 147 to the contacts 116 and 117, respectively, in the above mentioned escapement mechanism 148 through a control switchboard 149. The contacts 114 and 115 on main arm 112 are positioned to engage the contact 116 or 117 when the arm is pivoted by the escapement mechanism connected thereto in response to a rotational output from the differential 79 to ground the end of the increase or decrease coil through contact 116 or 117, completing the energizing circuit to the coil to drive the propeller pitch-control motor in the direction determined by which of the field coils is energized. Similarly a pitch-control motor 150 for varying the pitch of propeller 140 in engine 138 is operatively connected to an escapement mechanism 151 similar to the escapement mechanism 148, the mechanism 151 being responsive to the output of differential 152 comparing the speed of the master motor 15 with that of engine 138. Each engine is also provided with a three phase generator, such as units 153, 154, the rotors of which are coupled to the propeller shafts of propellers 139, 140, respectively, for driving their associated synchronous motors 17 and 155 in the synchronizing device at a constant ratio to the speed of the engine.

The control switchboard 149, shown in detail in Figure 8, is provided to turn on and off the synchronizer as a unit, and which will enable the pilot to throw the propeller pitch control of each engine separately, or all of them collectively, into either automatic or manual operation. Referring to Figure 8, the leads 147, 146 from the decrease and increase coils, respectively, of the pitch-control motor 141 are connected to fixed contacts of "decrease pitch" and "increase pitch" terminal limit switches 801 and 802, respectively. Likewise, a lead 803 is tapped off at the lower end of increase pitch coil 142 and connected to a fixed contact of the "feathering limit" switch 804. The movable arms of limit switches 801, 802 and 804 are connected to the movable arms 805, 806 and 807, respectively, these arms being ganged together to form a "normal-feather" switch 808. These arms are adapted to be moved in unison and engage one of two sets of contacts, one set connecting the leads from the decrease and increase limit switches 801, 802 through an auto-manual switch 809 to the contacts 117, 116 and open the circuit from the feather limit switch 804, and the other set opening the leads from the limit switches 801, 802, and grounding the lead through the "feather limit" switch 804. The "auto-manual" switch 809 comprises a pair of movable contact arms 810, 811 connected to the decrease and increase coils 143, 142, respectively, through switch 808 and adapted to engage selectively a pair of contacts connected to the contacts 117, 116 in the escapement mechanism for automatic operation or a set of contacts connected to contacts 812, 813 respectively in manual pitch control switch 814. This switch 814 comprises the decrease and increase fixed contacts 812, 813 and a pivoted contact lever 815, electrically grounded, and associated with a pair of springs 816, 817 adapted to return the lever 815 to center position when manual pressure is released from the lever. Thus three switch handles are provided for each motor, the "normal-feather" switch 808, the "auto-manual" switch 809, and the manual pitch control switch 814. A main "on-off" switch, not shown, is also provided in the supply circuit to the master motor 15. The mechanical motion involved in turning the "on-off" switch to "off" position may be interlocked with the "auto-manual" switch 809 in such a way as to unlatch the "auto-manual" switch for each engine to insure that the propeller pitch motor control is never left in automatic position when the synchronizer is not operating. The switches may be further interlocked so that each switch can be thrown independently from "Manual" to "Auto" and back when the synchronizer is energized and operating. Thus, if trouble were to develop suddenly anywhere in the system so that any one of the engines begins to change its speed from that at which it was normally operating, the pilot could turn off the main switch, deenergizing the unit and throwing all the engines on "manual" control. As the pilot locates the trouble, he can then throw the engines back onto automatic operation independently after turning the main "on-off" switch to "on" leaving the offending engine to be nursed by hand. The "feather limit" switch 804 is provided to allow the blades of the propellers to be feathered or put into a neutral position in case an engine fails completely and must be stopped. The electric brake 818 controlled by solenoid 819 is provided for each pitch control motor, and is adapted to be actuated by current passing through the armature lead of motor 141 to lock the propeller pitch against changing when the motor 141 is not energized. This brake is spring engaged and electrically released.

Shown at the left of Figure 6 is the electrical circuit for maintaining the speed of the master motor 15 at the preselected value and indicating when the motor is operating at this speed. The normally closed contacts of the vacuum switch 64 are placed between one of the field coils of the master motor 15 and ground, thus in series in the energizing circuit of the motor. A resistor 156 is connected across these contacts in shunt therewith. Likewise a capacitor 157 in series with a low resistance pilot lamp 158 is connected across the motor control resistance 156 and consequently in shunt of the contacts of vacuum switch 64 as an arc suppression filter and indicator. Thus the instantaneous surges of current occurring when the contacts open or close will illuminate the pilot lamp substantially continuously when the master motor is "on speed." This lamp is positioned behind a transparent window in the front panel 33 of the housing unit to be readily visible, as shown in Figure 1.

Overall operation of the system is as follows. The master motor control knob 11 is adjusted to the desired R. P. M. as indicated by the position of the pointer on the tachometer dial and then locked against vibration slippage. Assuming that the timing motor control knob and the position of the contact adjusting stop members 126, 127 have been adjusted for the proper amount of change of pitch of the propeller during one correction cycle of the system, i. e. the time duration of flow of current through the contacts; if the speeds of rotation of the master motor 15 and of the engine coupled to one of the subtracting differentials 79, 152 are different, rotational output will be produced from the differential the direction of which is determined by which of the two speeds under comparison is greater. This output, coupled to the trip rotor 91 in the escapement mechanism controlling the propeller pitch-control motor for the engine to which the differential is coupled, trips one of the pawls 99, 100, for example pawl 99, out of engagement with the shoulders on the ratchet wheel 93 which it engaged and allows the ratchet wheel to be rotated by the driving force of a timing gear 46 through friction disks 95 and 97. Likewise, tripping the pawl 99 allows it to be drawn upward by the spring 109 connected between the pawl and the mounting plate 108, thus rotating the lever 103 and the main arm 112 coupled thereto to close the contacts 115, 117 to one field coil of the propeller pitch control motor and vary the pitch of the propeller. These contacts are, of course, re-opened a short time before the next succeeding shoulder on the ratchet wheel 93 has driven the pawl 99 against the force of spring 109 back into its initial position. These correction cycles are continued, due to the error signal output of the differential, until the master motor and the engine are accurately synchronized and the trip rotor no longer rotates. This variation of the pitch of the propeller varies the loading on the engine and thus the engine speed, i. e. increase of propeller pitch increases the loading and thus decreased the speed of the engine. It will be obvious that, since the speed each engine is simultaneously compared with that of the master motor and synchronized therewith, all of the engines operate in synchronism with each other.

A particularly desirable characteristic of this system is that the pitch correction is applied intermittently, thus absorbing only a small portion of each correction cycle, thereby allowing a short period of time in which no correction is applied so that the change in pitch can take effect and vary the engine speed accordingly. Thus, the amount of change in pitch applied during each cycle can be adjusted to prevent over correction and consequent hunting without materially reducing the overall response time of the system. This effectively amounts to applying a small pitch correction and then comparing the engine output with a given standard to determine if the correction has produced the desired change, then repeating this cycle until the engine operates in proper relation with the standard.

Another desirable feature of this system is that, due to the fact that the speed of rotation of the differential output and thus of the trip rotor is directly proportional to the magnitude of the difference in the speeds of the engine and the master motor, i. e. the amount the engine is out of synchronism, for large error outputs from the differential the correction applied to the propeller is very large, while the correction becomes very small when only small magnitude error signals occur. This produces a substantially instantaneous correction of the engine speed to near synchronization when the engine falls far out of synchronization, such as when one side of the plane enters an air pocket. For example, this system was found to correct for a speed difference of 600 R. P. M. in approximately 4 seconds to bring the engine to within 10 R. P. M. of synchronization, and required an additional 4 to 5 seconds to lock the engine into exact synchronization.

This rapid correction of large errors occurs by virtue of the fact that the trip rotor 91 is driven at a rapid speed, thereby retripping the pawls before they have been driven far enough toward the seating position to open the contacts 114—116 or 115—117, due to contact arms 118 and 119 being able to follow the contacts 114 or 115 part way home. This causes the contacts on the main arm to be closed continuously until the trip rotor begins to slow down, thus applying a continuous correction instead of a small, intermittent one. The relationship of timing motor speed and related contact adjustments can be regulated to maintain continuously closed contacts when the difference speed of any engine to standard is greater than about 10 R. P. M.

Various modifications may be made in the invention without departing from the spirit and scope thereof, and it is desired therefore that only such limitations shall be placed thereon as are imposed by the prior art and are set forth in the appended claims.

The invention described herein may be manufactured and used by or for the Government of the United States of America for governmental purposes without the payment of any royalties thereon or therefor.

What is claimed is:

1. In an engine synchronizing system, a master motor, a controlled engine, a variable pitch propeller driven by said controlled engine, reversible pitch-adjusting means for said propeller, a pair of control circuits for said pitch adjusting means, one for effecting an increase and the other a decrease in pitch, subtracting differential means coupled to said motor and said engine, a pivoted contact member common to either of said control circuits and positioned to selectively energize one of said circuits, an escapement mechanism controlling the position of said contact member comprising a pair of pawl members coupled to said contact member, means normally holding said pawls against operation whereby neither of said control circuits are energized, and tripping means for said pawls coupled to the output of said differential means for actuation in response to a difference in the speeds of said motor and said engine to trip one or the other of said pawls and permit said contact member to energize one or the other of said control circuits.

2. In an engine synchronizing system, a master motor, a controlled engine, a variable pitch propeller driven by said engine, reversible pitch-adjusting means for said propeller, a pair of control circuits for the pitch-adjusting means, one for effecting an increase and the other a decrease in pitch, a subtracting differential gear system coupled to said master motor and said controlled motor, a pivoted contact member common to either of said control circuits and positioned to selectively energize one of said circuits, and an escapement mechanism controlling the position of said contact member comprising pawl members coupled to said contact member, holding means normally positioning said pawl-members whereby neither of said control circuits are energized, spring means urging said pawl members and said contact member into a position whereby one or the other of said control circuits is energized, and tripping means coupled to the output of said differential and actuated by a difference in the speeds of said motor and engine to disengage one of said pawl members from said holding means whereby said spring means may shift said contact member to energize one of said control circuits.

3. In an engine synchronizing system, a master motor, a controlled engine, a variable pitch propeller driven by said engine, reversible pitch-adjusting means for said propeller, a pair of control circuits for the pitch-adjusting means, one for effecting an increase and the other a decrease in pitch, a subtracting differential gear system coupled to said master motor and said controlled motor, a pivoted contact member common to either of said control circuits and positioned to selectively energize one of said circuits, an escapement controlling the position of said contact member comprising a pair of pawl members coupled to said contact member, spring means urging said pawl members and said contact members into a position whereby one or the other of said control circuits is energized, a pair of ratchet wheels having shoulders abutting said pawls, said ratchet wheels being frictionably driven to hold said pawls and thus said contact member in a position whereby neither of said circuits is energized, and tripping means coupled to the output of said differential means so as to be actuated when a difference in the speeds of said motors occurs to disengage one of said pawls from the ratchet wheel associated therewith, thereby allowing said spring means to position said pawls and said contact member to energize one of said control circuits.

4. In an engine synchronizing system, a master motor, a controlled engine, a variable-pitch propeller driven by said engine, reversible pitch-adjusting means for said propeller comprising a motor having two field coils for driving said motor in opposite directions, said motor being coupled to said propeller so as to increase the propeller pitch when rotating in one direction and to decrease the pitch when rotated in the opposite direction, a subtracting differential gear system coupled to said master motor and said controlled engine, a pivoted contact member positioned to selectively energize one or the other of said field coils, and an escapement mechanism controlling the position of said contact member comprising a lever pivoted at its center to an end of said contact member and at each end to a pawl member, stop means engaging each end of said lever and defining its normal position in which neither of said field coils is energized, spring means urging said lever to rotate about one or the other of said stop means, ratchet wheels being frictionally driven to hold said pawls and thus said lever in their normal position against the force of said spring means, and tripping means coupled to the output of said differential and actuated by a difference in the speeds of said motors to disengage one of said pawls from the ratchet wheel associated therewith thereby allowing said spring means to rotate said lever about one of said stops and position said contact member to energize one of said field coils, said frictionally driven ratchet wheel operating, when said pawl is disengaged therefrom, to bring a succeeding shoulder into engagement with said pawl and return said pawl to its normal position after a given interval of time.

LA VERNE R. PHILPOTT.

REFERENCES CITED

The following references are of record in the file of this patent:

UNITED STATES PATENTS

| Number | Name | Date |
|---|---|---|
| 2,076,202 | Lewellen et al. | Apr. 6, 1937 |
| 2,160,324 | Berges | May 30, 1939 |
| 2,251,388 | Bates | Aug. 5, 1941 |
| 2,261,145 | Dickey | Nov. 4, 1941 |
| 2,271,629 | Couch | Feb. 3, 1942 |
| 2,314,610 | Day | Mar. 23, 1943 |
| 2,322,114 | Clare et al. | June 15, 1943 |
| 2,399,685 | McCoy | May 7, 1946 |
| 2,431,687 | Drake | Dec. 2, 1947 |

FOREIGN PATENTS

| Number | Country | Date |
|---|---|---|
| 517,117 | Great Britain | Jan. 22, 1940 |
| 671,248 | France | Aug. 31, 1929 |